(12) United States Patent
Guzman et al.

(10) Patent No.: US 9,388,587 B2
(45) Date of Patent: Jul. 12, 2016

(54) METHOD OF MANUFACTURING ARCHITECTURAL COMPONENTS

(71) Applicants: David A. Guzman, Pompano Beach, FL (US); Lionel Guzman, Pompano Beach, FL (US)

(72) Inventors: David A. Guzman, Pompano Beach, FL (US); Lionel Guzman, Pompano Beach, FL (US)

( * ) Notice: Subject to any disclaimer, the term of this patent is extended or adjusted under 35 U.S.C. 154(b) by 0 days.

(21) Appl. No.: 14/534,890

(22) Filed: Nov. 6, 2014

(65) Prior Publication Data

US 2016/0130823 A1     May 12, 2016

(51) Int. Cl.
*E04C 2/38*     (2006.01)
*E04F 19/04*    (2006.01)
*G05B 19/4097*  (2006.01)

(52) U.S. Cl.
CPC ............ *E04F 19/04* (2013.01); *E04F 19/0436* (2013.01); *G05B 19/4097* (2013.01); *G05B 2219/33099* (2013.01); *G05B 2219/37442* (2013.01)

(58) Field of Classification Search
CPC ... E04F 10/08; E04F 19/0463; E04F 19/0495; E04F 2019/0422; E04F 2019/04544; E04F 19/02; E04F 19/04; E04F 19/0436; Y10T 403/559
USPC ........................................................ 52/716.1
See application file for complete search history.

(56) References Cited

U.S. PATENT DOCUMENTS

| | | | | |
|---|---|---|---|---|
| 2,181,164 A * | 11/1939 | Elmo | ................... | B27H 1/00 156/268 |
| 2,569,916 A * | 10/1951 | Barnes | ................ | E04F 19/0436 219/213 |
| 3,117,902 A * | 1/1964 | Holzhelmer | .......... | F16L 59/022 138/149 |
| 3,909,995 A * | 10/1975 | Bainter | ................... | E04C 2/296 52/262 |
| 5,001,877 A * | 3/1991 | Edwards | ................... | B44C 5/00 403/295 |
| 5,232,762 A * | 8/1993 | Ruby | ................... | A47B 96/202 138/118 |
| 5,437,138 A | 8/1995 | Tuohay et al. | | |
| 6,082,071 A | 7/2000 | Richardson | | |
| 6,786,016 B1 * | 9/2004 | Wood | ................... | A01M 1/2011 43/107 |
| 7,897,262 B1 * | 3/2011 | Chambers | ............... | E04F 19/04 312/114 |
| 2005/0191466 A1 * | 9/2005 | Andrade | ................... | B44F 9/02 428/167 |
| 2005/0193640 A1 * | 9/2005 | Schiedegger | ........... | F24B 1/198 52/36.3 |
| 2005/0257464 A1 * | 11/2005 | Skulsky | ................... | B44C 5/00 52/311.1 |
| 2005/0269558 A1 | 12/2005 | Keefe | | |
| 2006/0196144 A1 * | 9/2006 | Spek | ......................... | E04B 9/30 52/716.1 |
| 2006/0283110 A1 * | 12/2006 | Ferguson | ............ | E04F 19/0436 52/211 |
| 2007/0020475 A1 * | 1/2007 | Prince | ...................... | B05D 1/40 428/537.1 |
| 2007/0271865 A1 * | 11/2007 | Rowohlt | ............. | E04F 19/0436 52/287.1 |
| 2009/0272054 A1 | 11/2009 | Swain, Jr. | | |
| 2010/0005732 A1 * | 1/2010 | Schwartau | ................ | E04B 7/04 52/90.1 |
| 2011/0282476 A1 | 11/2011 | Hegemier et al. | | |
| 2012/0318314 A1 | 12/2012 | Okuda | | |
| 2012/0328823 A1 | 12/2012 | Monteer | | |
| 2013/0091791 A1 * | 4/2013 | Hardy | ................. | E04F 19/0436 52/288.1 |
| 2014/0174009 A1 * | 6/2014 | Williams | ............... | B62D 63/00 52/220.1 |
| 2015/0075094 A1 * | 3/2015 | Schucker | ............. | A47G 1/1686 52/288.1 |

* cited by examiner

Primary Examiner — Brian Mattei
(74) Attorney, Agent, or Firm — McHale & Slavin, P.A.

(57) ABSTRACT

A method of forming architectural trim from cellular polyvinylchloride. The process employs manufacturing dimensionalized cellular PVC architectural components from sheet goods that can achieve both linear and radius shapes without using heat bending techniques. The process strengthens the cellular PVC giving it more structural integrity than other products made strictly of cellular PVC. These techniques enable the manufacture of components with tighter tolerances than traditional heat bending techniques which distort the size and shape of the material which make accurate and precise assembly difficult.

7 Claims, 8 Drawing Sheets

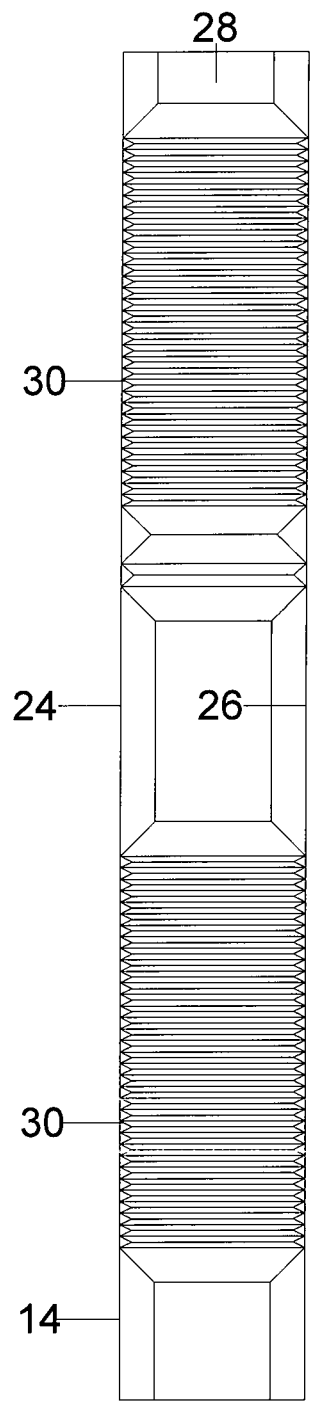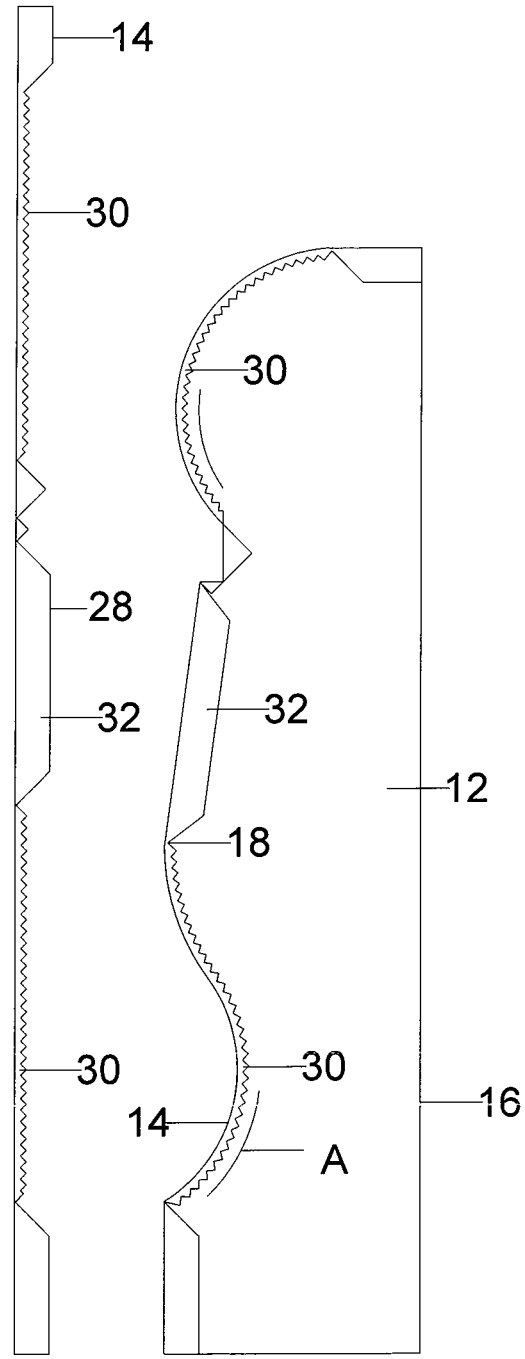
Fig. 1    Fig. 2    Fig 3

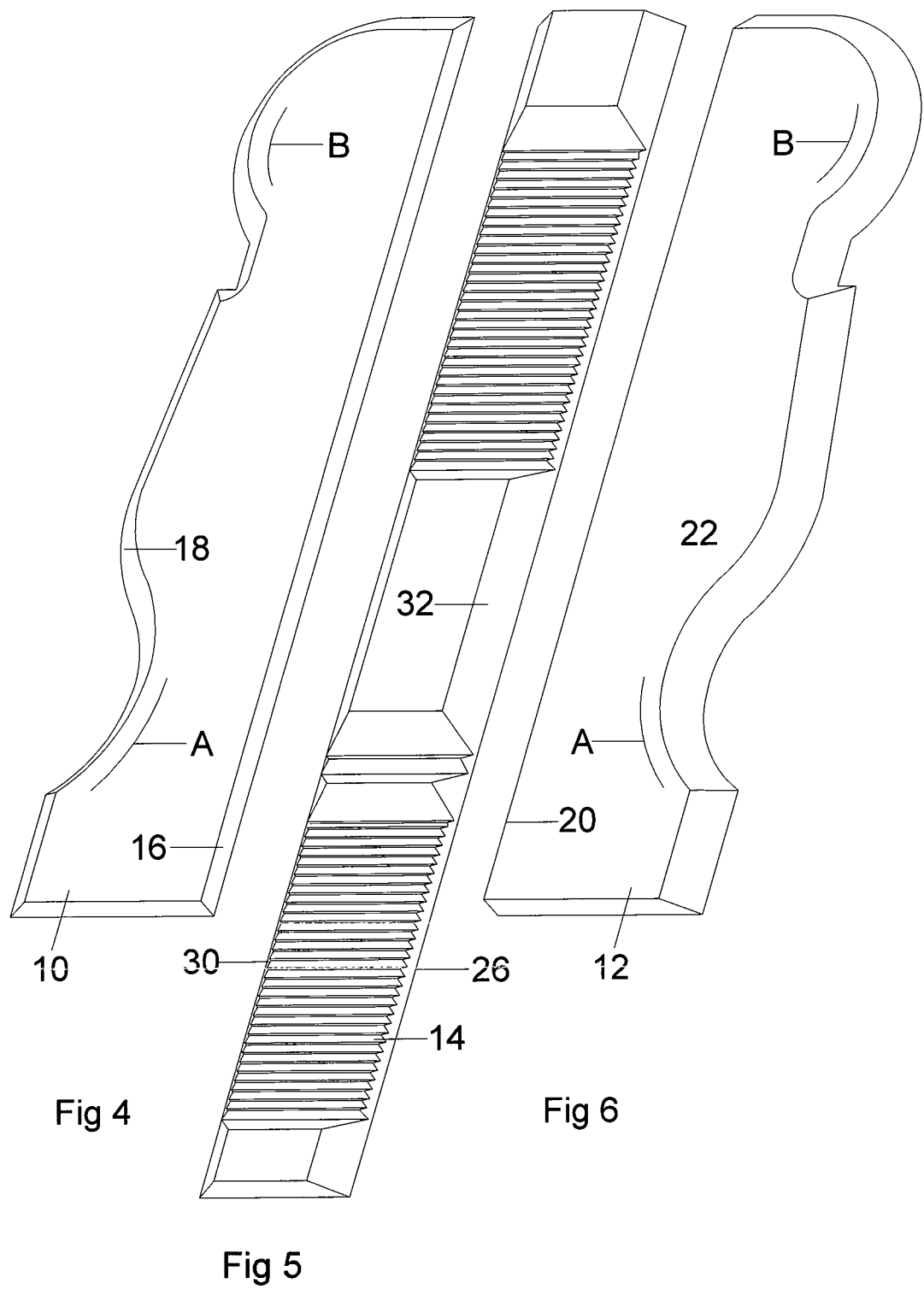

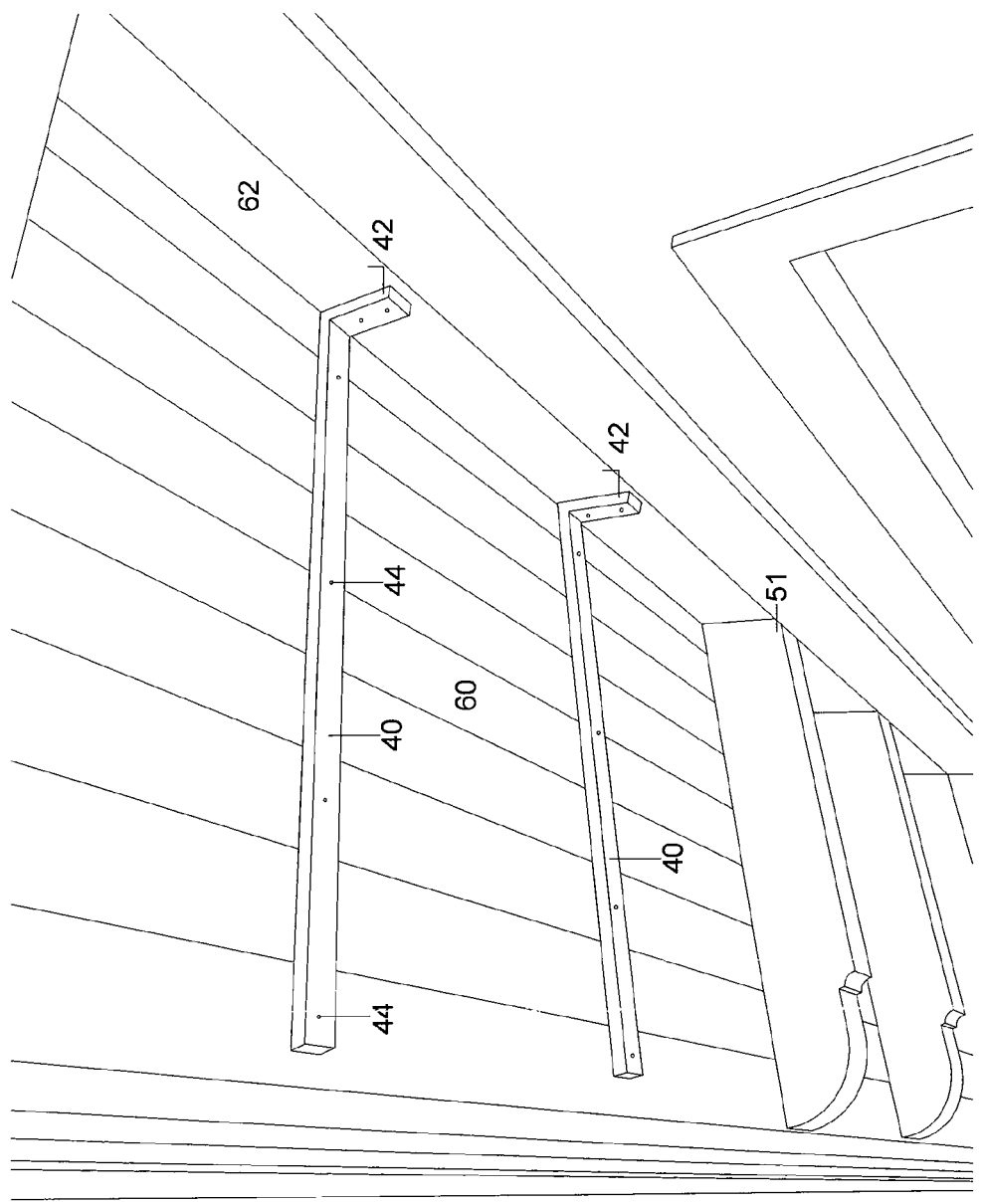

METHOD OF MANUFACTURING ARCHITECTURAL COMPONENTS

FIELD OF THE INVENTION

The invention is directed to the field of architecture and in particular to a method of forming architectural trim components from cellular polyvinylchloride or the like material.

BACKGROUND OF THE INVENTION

Architectural trim components are traditionally constructed from wood. Unfortunately, wood is susceptible to decay, and the most common wood decay is dry rot. Dry rot is caused by certain fungi which grow when sufficient moisture is present allowing the fungi to grow and digest the wood, causing the wood to shrink, show a brown discoloration, and crack into pieces. There are many species of fungi that can cause dry rot. For instance, fungus such as serpula lacrymans, armillaria, or lignicolous can cause dry rot wood decay. Some fungi secrete an enzyme that breaks down cellulose in wood which can also lead to discoloration and cracking known as soft rot. These include fungus such as chaetomium, ceratocystis and kretzschmaria deusta fungi. White rot fungi, common in hardwoods used outdoors, breaks down lignin in wood, leaving lighter colored cellulose behind.

Plastics, including composites made of plastic and wood, have been recognized as a substitute for architectural trim structures. Plastic has weather resistant qualities, can be treated to resist ultraviolet radiation, and has a surface porosity that accepts painting. However, simply substituting plastic for a wood trim structure is not as desirable since plastic possesses poor structural capabilities. Further, a large chunk of plastic creates both a weight and a cost disadvantage. And while plastic may be a beneficial substitute for small trim components, the trend has been to develop lighter, stronger, and more durable products.

Heating plastic to form curves and bends is well known, but includes the inherent problems caused by the heat changing the structure of the plastic. Fiber reinforced thermoset plastics, such as fiberglass, also provide desirable weather resistant performance qualities but lack the look and feel of traditional wood trim components. Further, fiber reinforced plastics are difficult to shape, modify, or otherwise work with in the field.

What is lacking in the art are architectural trim components, and the method of constructing them, that can substitute for wood architectural trim components. The components should be constructed of plastic, or a composite of plastic and wood. A preferable material is cellular polyvinylchloride or the like material to produce trim components that are light weight, fast and easy to manufacture, easy to mount, and are weather resistant.

SUMMARY OF THE INVENTION

Disclosed is a method of forming architectural trim components from a plastic, wood-plastic composite, or similar material such as cellular polyvinylchloride ("PVC"), and the product produced by the method. The method comprises the steps of: drawing left, right and front trim members of an architectural trim design on a CAD system using guidelines and machining layers, verifying all tool paths and tolling is correct, importing the CAD drawing into AlphaCAM, and applying machining styles to layers. The output from the AlphaCAM is in NC code and directed to a CNC router. The CNC router is operated to form individual trim members that are assembled using an accelerated PVC adhesive, or similar adhesive. A reactive resin system, filled or unfilled, is then used to fill in spaces or gaps between assembled components. Exposed reactive resin is sanded and the architectural trim component is then primed for painting. The architectural trim can be painted before or after installation, providing a weather resistant product having superior properties to conventional wood.

The process employs manufacturing dimensionalized cellular PVC architectural trim components from plastic sheets to produce both linear and radius shapes without using heat bending techniques, thus preventing the compromised structural integrity associated with such techniques. In place of the structural weakening of the plastic caused during heating, the instant process strengthens the structure made from cellular PVC by giving it a greater structural integrity than conventional products made strictly of cellular PVC. The disclosed technique enables the manufacture of trim components with tighter tolerances than through traditional heat bending techniques by eliminating structural distortion.

An objective of the invention is to provide a process wherein architectural trim components of varying designs and sizes can go from a design stage to manufacturing in a matter of minutes.

Another objective of the invention is to provide a method of creating architectural components that can be repeated quickly and accurately.

Still another objective of the invention is to provide architectural trim components that can be manufactured using materials and techniques that create a product that will not rot, crack, warp, and is weather resistant.

Yet still another objective of the invention is to provide an architectural trim that is hollow making it lighter and easier to install versus wood or solid plastic trim.

Another objective of the invention is to provide an architectural trim product that looks the same as traditional architectural trim made from wood, yet eliminates all the problems associated with wood.

Yet still another objective of the invention is to provide an architectural trim product that requires minimal maintenance in even the harshest of climates.

Still another objective of the invention is to provide a process that allows manufacturing of cellular PVC components to create an unlimited combination of shapes and sizes from sheet goods of varying thicknesses.

Other objectives and further advantages and benefits associated with this invention will be apparent to those skilled in the art from the description, examples and claims which follow.

BRIEF DESCRIPTION OF THE DRAWINGS

FIG. 1 is a top view of the frontal component;
FIG. 2 is a side view of the frontal component;
FIG. 3 is a cross sectional view of the frontal component assembled to the side component;
FIG. 4 is a perspective view of the left side component;
FIG. 5 is a perspective view of the frontal component;
FIG. 6 is a perspective view of the right side component;
FIG. 7 is a pictorial of a mounting structure.

DESCRIPTION OF THE PREFERRED EMBODIMENT

Figure 8:
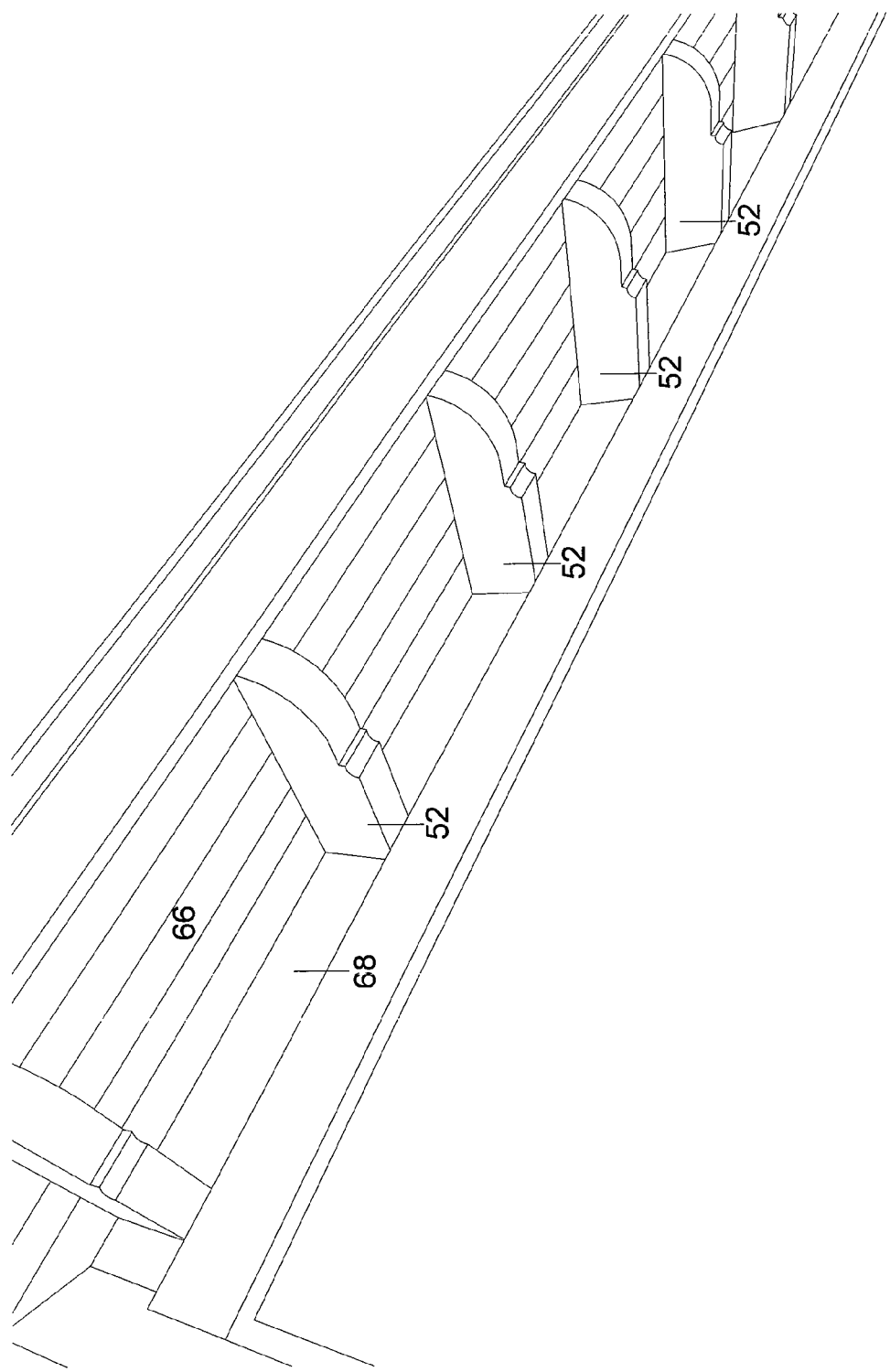
FIG. 8 is a pictorial of an architectural trim installation.

Referring to the Figures in general, disclosed is an example of the invention used for architectural trim from cellular polyvinylchloride ("PVC"). One architectural trim component 50 disclosed in the FIGS. 1-6 and 10-11, is referred to as the Applicant's Outlooker design which is a decorative trim component placed beneath a soffit 60 commonly used in early construction and now used to assimilate early construction techniques and appearance. The method of manufacturing such decorative trim components employs a CAD software program for drawing the architectural trim component design, which is then cut from a PVC sheet. By way of example, the Applicant's Outlooker design shown in FIGS. 1-6 has a left side component 10, a right side component 12 forming a mirror image of the left side component 10, and a frontal component 14. The left side component 10 having a substantially uniform wall thickness and is further defined by a rear edge 16 and a front contoured edge 18. Similarly the right side component 12 has a substantially uniform wall thickness and the design is defined by a rear edge 20 and a front contoured edge 22. The frontal component 14 is rectangular shape having a thickness with a first side edge 24 having a reciprocal angular shape to the front contoured edge 18 of the left side component 10 and a second side edge 26 having a reciprocal angular shape to the front contoured edge 22 of the right side component 12.

The CAD drawing of the frontal component 14 is imported into a CAD/CAM program such as ALPHACAM of One Water Ridge Plaza, Charlotte, N.C. 28217, having a programmed algorithm for applying machining styles to layers along the length of the frontal component 14. In particular the ALPHACAM output in numerical control code for operating a CNC router for cutting the trim shapes from a plastic sheet and positioning guidelines, machine lines 30, and layers 32 along the length of the frontal component 14 wherein a CNC router forms the individual trim components. To allow for curvatures, the machine lines 30 along section A cut into and decrease the thickness along section A of the frontal component 14, allowing the frontal component 14 to bend conjugate to front contoured edges 18 and 22. In FIG. 3, section A illustrates a concave positioning of the frontal component 14 and machine lines 30 along section B illustrates a convex positioning. In one method, these machine lines 30 are v-shaped cuts into the inner face 28 of the frontal component 14, where decreasing the distance between cuts and increasing the depth of the cuts allows for a smaller curvature radius. This process allows the cellular PVC to bend along a contoured edge without the decrease in structural integrity associated with the heating and bending of plastics.

The frontal component 14 is assembled with the left and right trim components 10, 12 wherein the frontal component 14 bends conjugate to the reciprocal front contoured edges 18, 22 formed on the left and right side of each individual component 10, 12. The components are permanently fastened together using an accelerated PVC adhesive. While proper machining all but eliminates any spacing between components, space that may still exist is permanently filled with a two part epoxy. Once dry, excess epoxy and any uneven corner edge is sanded to form a uniform seamless corner edge, giving the appearance of a single solid piece of trim.

The architectural trim can then be primed and painted. Alternatively the architectural trim can be primed, mounted to a building structure, and then painted, or mounted and then primed and painted.

Figure 9:
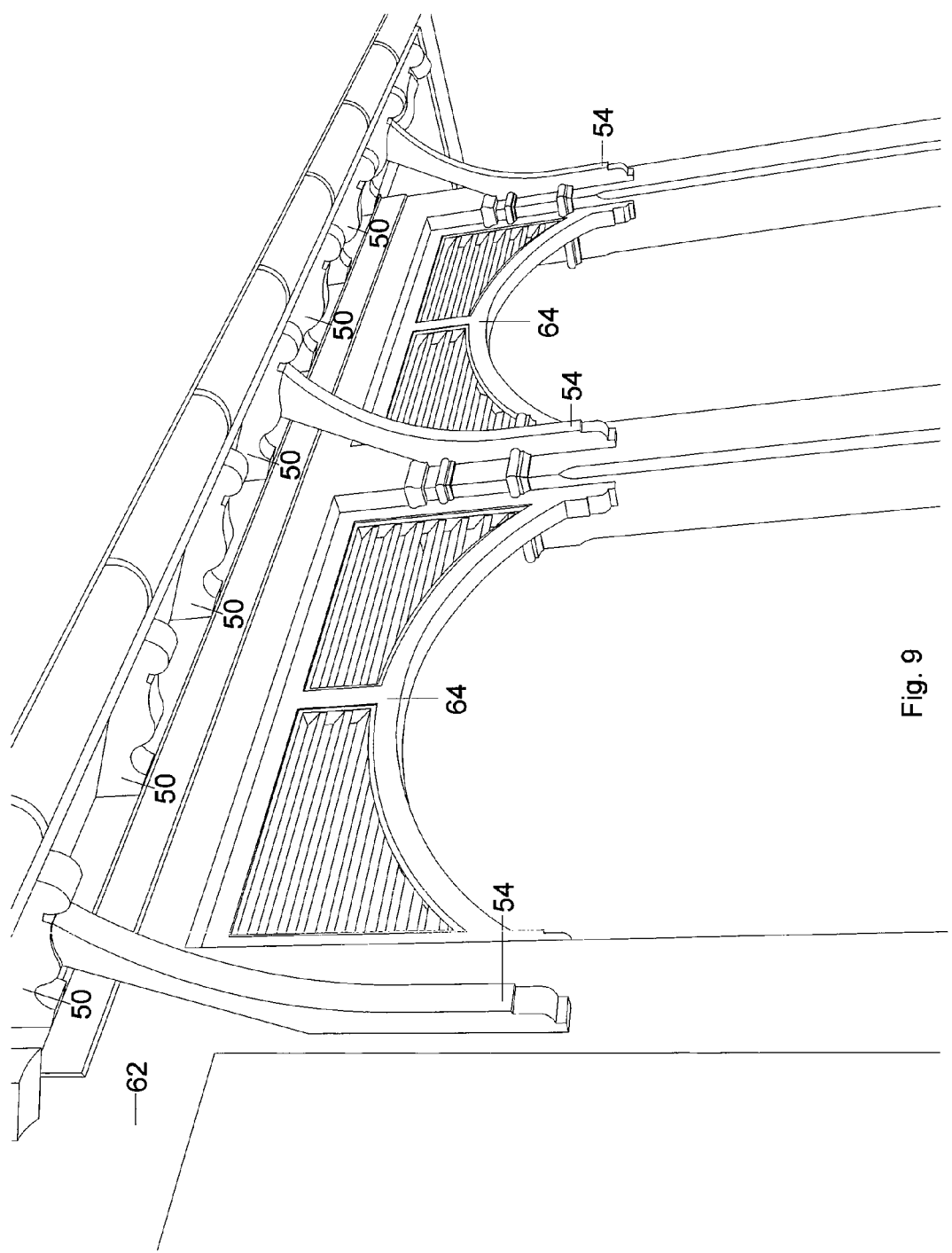
FIG. 9 is another pictorial of an architectural trim installation.
Figure 10:
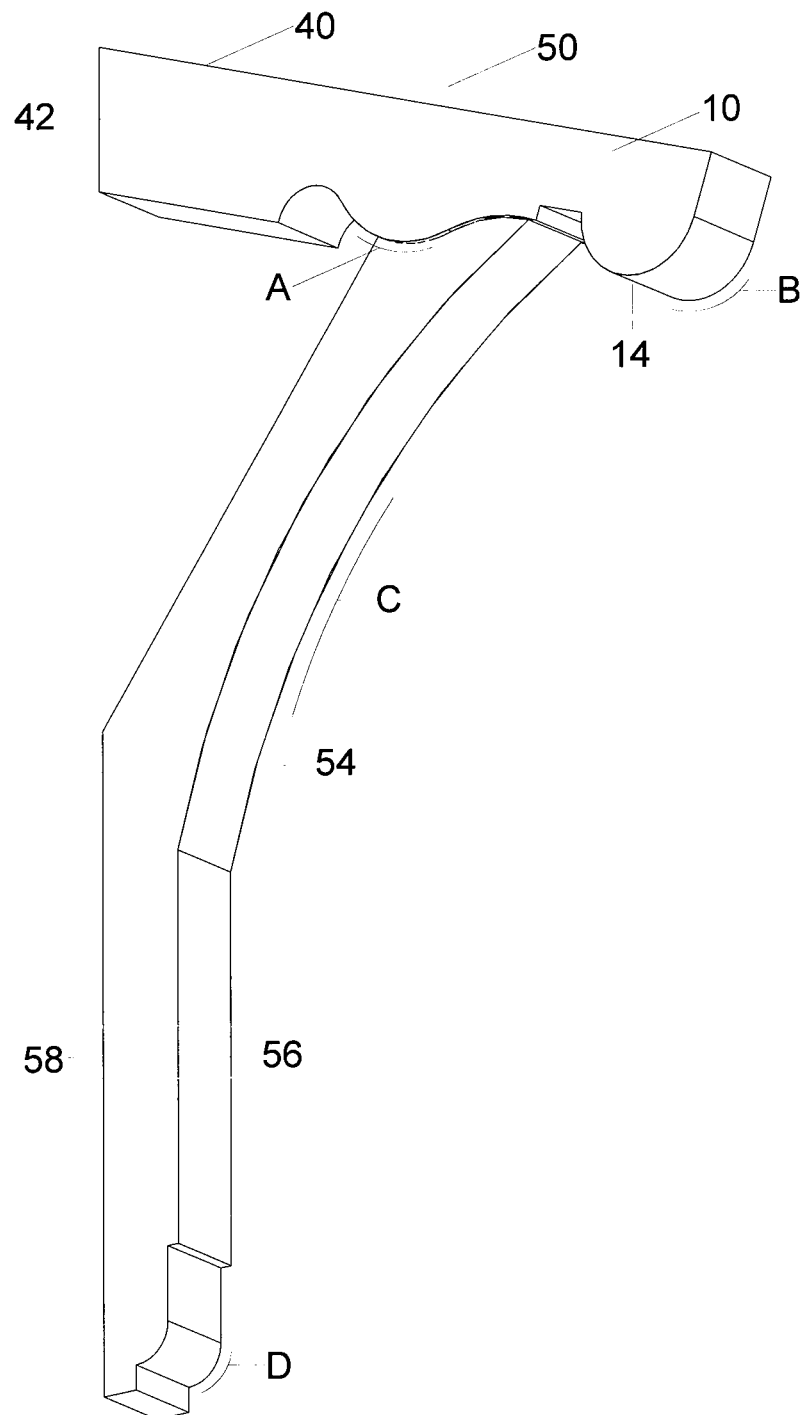
FIG. 10 is perspective view of two pieces of architectural trim attached together.
Figure 11:
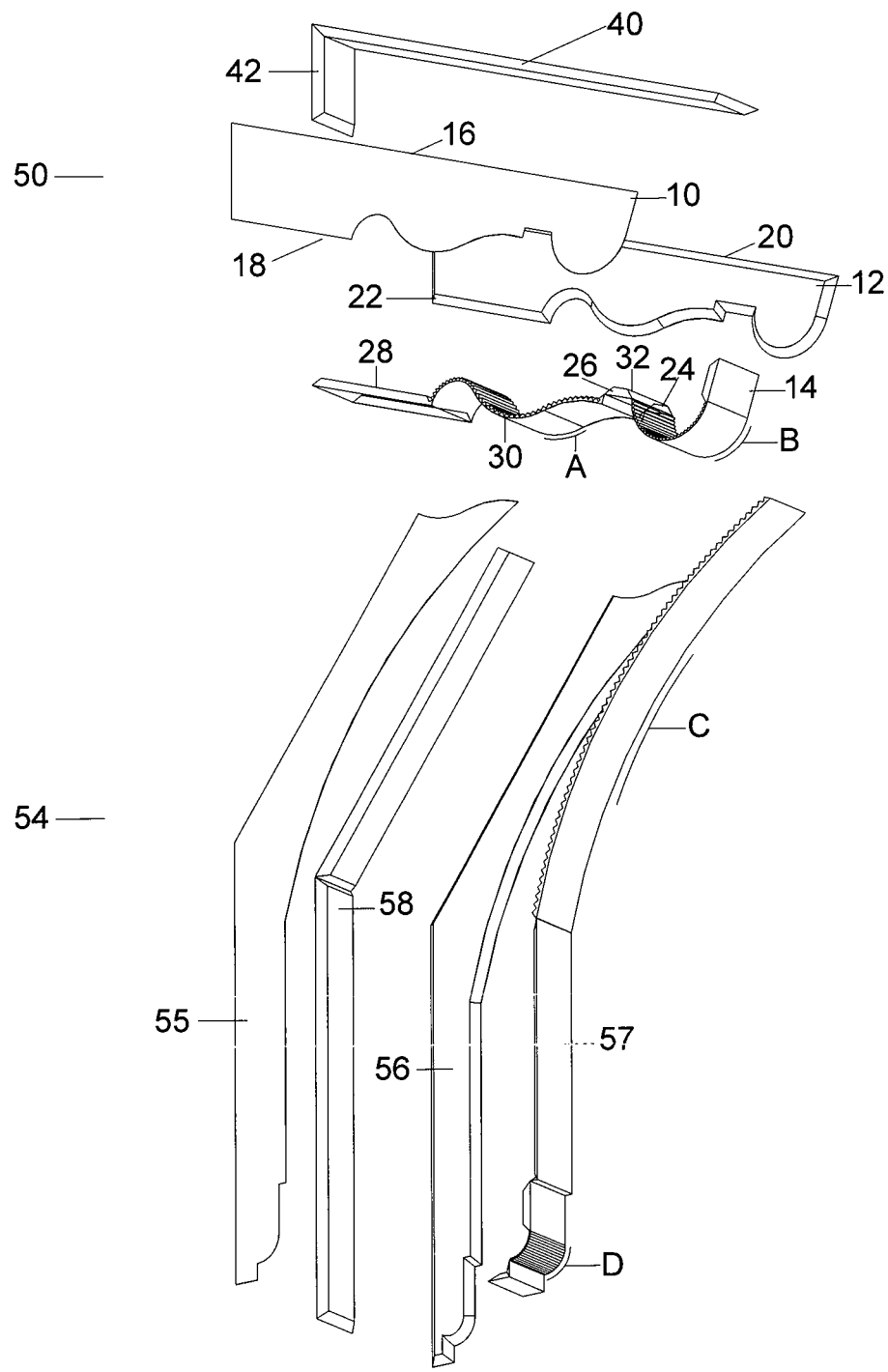
FIG. 11 is an exploded view of the two pieces of architectural trim.

FIG. 7 illustrates an installation having a top mounting support 40 securable to soffit 60, and a side mounting support 42 securable to a wall 62 of a building. Preferably the mounting supports 40 and 42 are made out of the similar PVC material; however, since the mounting supports 40 and 42 will fit within the back surface of the architectural trim and are thereby hidden permanently, other suitable materials may be used. The mounting supports 40 and 42 can be secured to the soffit and wall by conventional fasteners 44 such as screws or nails. Additionally, the mounting supports 40 and 42 can be formed as two separate pieces, or as one piece with a machined v-cut allowing for the angled bend. An architectural trim component 51 can be placed over the mounting supports and fastened by screws, nails or the like. The use of PVC mounting material further provides an option of attaching the architectural trim component 51 by adhesive. As seen in FIG. 8, architectural trim components 52 can be placed in series along a building soffit 66 and abutting frieze board 68, giving the appearance of classical architectural. FIG. 9 shows how multiple pieces of architectural trim can be incorporated into the outer wall of a building, where the architectural trim of the instant invention provides components 50, 54, and a louver trim component 64. Additionally, as seen in FIGS. 9-11, multiple architectural trim components 50, 54 can be joined together and affixed to the building exterior. This combination of two architectural trim components 50 and 54 can also be seen in FIG. 10, where the components are shown from a rear side angle. FIG. 11 is an exploded view of FIG. 10. Left side component 55, right side component 56, front component 57, and back component 58 of trim component 54 are depicted in this exploded view.

Figure 12:
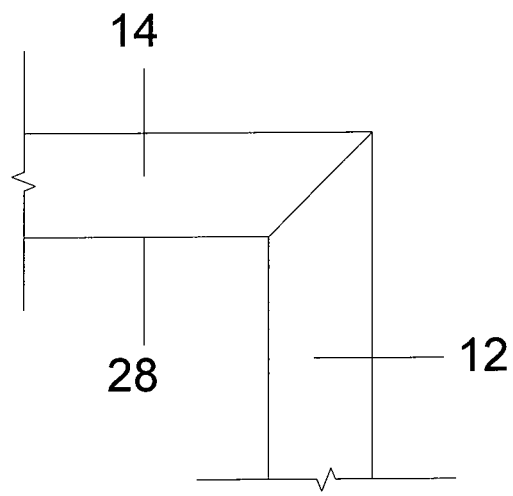
FIG. 12 is a perspective view of the attachment of two components of an architectural trim component.
Figure 13:
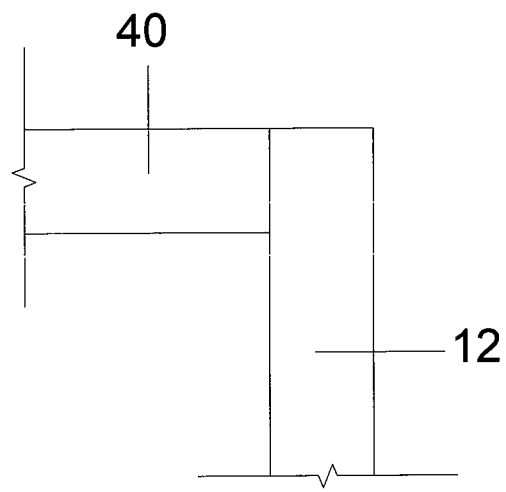
FIG. 13 is a perspective view of an alternative attachment of two components of an architectural trim component.

FIGS. 12-13 show how the pieces of cellular PVC can be adhered together. In FIG. 12, a frontal component 14 and a right side component 12 are shown cut at angles so that the mounting surfaces of each meet at a corner of the architectural trim component 50. FIG. 13 depicts a top mounting support 40 attached to a right side component 12 so that the mounting support is hidden from view when the architectural trim component 50 is mounted to the building exterior. FIGS. 12 and 13 are illustrative and not limiting, as other mounting connections can be used to bond the two pieces of cellular PVC. Tongue-and-groove, lock mitre, and curved edges are examples of other connections which can be used to increase the surface area of mounting surface where the two PVC pieces are joined, where an increase in surface area on the mounting surfaces can increase the strength of the bond between the two components.

The method of forming architectural trim from cellular polyvinylchloride allows for unlimited radius forms wherein the machining technique eliminates the need for heat bending or laminating. While a detailed embodiment of the instant invention directed to Applicant's Outlook pattern is disclosed herein, it is to be understood that the disclosed embodiments are merely exemplary of the invention, which may be embodied in various forms and include most any radius form. Therefore, specific functional and structural details disclosed herein are not to be interpreted as limiting, but merely as a basis for the claims and as a representation basis for teaching one skilled in the art to variously employ the present invention in virtually any appropriately detailed structure.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An architectural trim system comprising:
    a left side member having an upper mounting surface, a side mounting surface, a beveled mounting surface, an outer face, and an inner face;
    a right side member having an upper mounting surface, a side mounting surface, a beveled mounting surface, an outer face, and an inner face;
    a front member having a left beveled edge mounting surface, a right beveled edge mounting surface, a front mounting surface, a rear mounting surface, an outer face, and an inner face, with a thickness between said outer face and said inner face, said inner face including a plurality of ridge shaped cuts placed parallel to each other allowing said front member to bend conjugate to and interface with said left side member and right side member beveled mounting surfaces having at least one convex and one concave section;
    a top mounting support having a left mounting surface, a right mounting surface, a front mounting surface, a rear mounting surface, an outer face, and an inner face;
    a side mounting support having a left mounting surface, a right mounting surface, a top mounting surface, a bottom mounting surface, an outer face, and an inner face;
    whereby said front member left beveled edge mounting surface attaches to said left side member beveled mounting surface, said front member right beveled edge mounting surface attaches to said right side member beveled mounting surface, said left side member upper mounting surface attaches to said top mounting support left mounting surface, said right side member upper mounting surface attaches to said top mounting support right mounting surface, said left side member side mounting surface attaches to said side mounting support left mounting surface, and said right side member side mounting surface attaches to said side mounting support right mounting surface.

2. The architectural trim system of claim 1 wherein said left side member is made of a material containing plastic, said right side member is made of a material containing plastic, and said front member is made of a material containing plastic.

3. The architectural trim system of claim 2 wherein said top mounting member is made of a material containing plastic and said side mounting member is made of a material containing plastic.

4. The architectural trim system of claim 2 wherein said material containing plastic is a wood-plastic composite.

5. The architectural trim system of claim 2 wherein said material containing plastic is cellular PVC.

6. The architectural trim system of claim 2 wherein said front member left mounting surface attaches to said left side member contoured mounting surface and said front member right mounting surface attaches to said right side member contoured mounting surface by an accelerated PVC adhesive.

7. The architectural trim system of claim 1 wherein said top mounting support outer face attaches to a soffit of a building by a mechanical fastener, and said side mounting support outer face attaches to an exterior wall of said building by a mechanical fastener.

* * * * *